April 5, 1938.          H. HEFTI          2,113,022
DISPENSING DEVICE
Filed Feb. 26, 1937          2 Sheets-Sheet 1
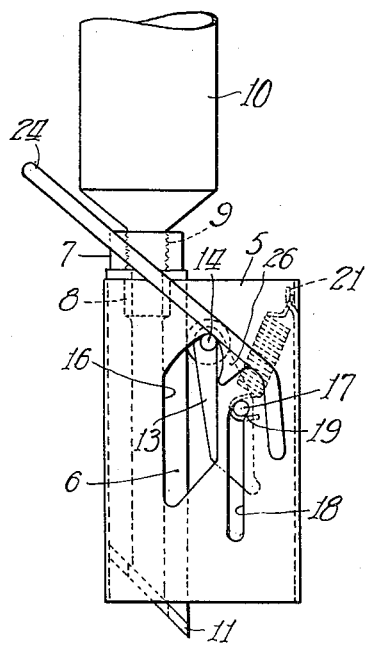
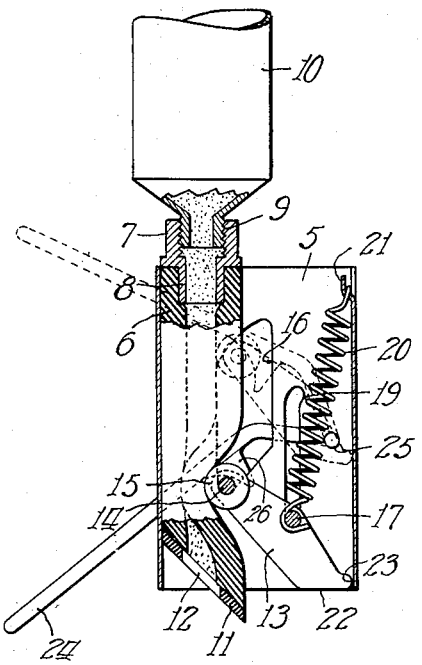
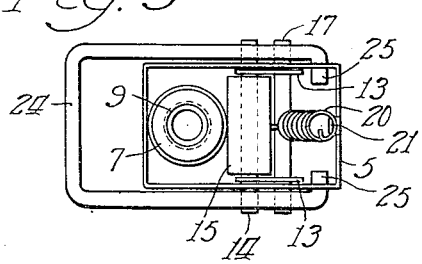
Inventor
Hans Hefti

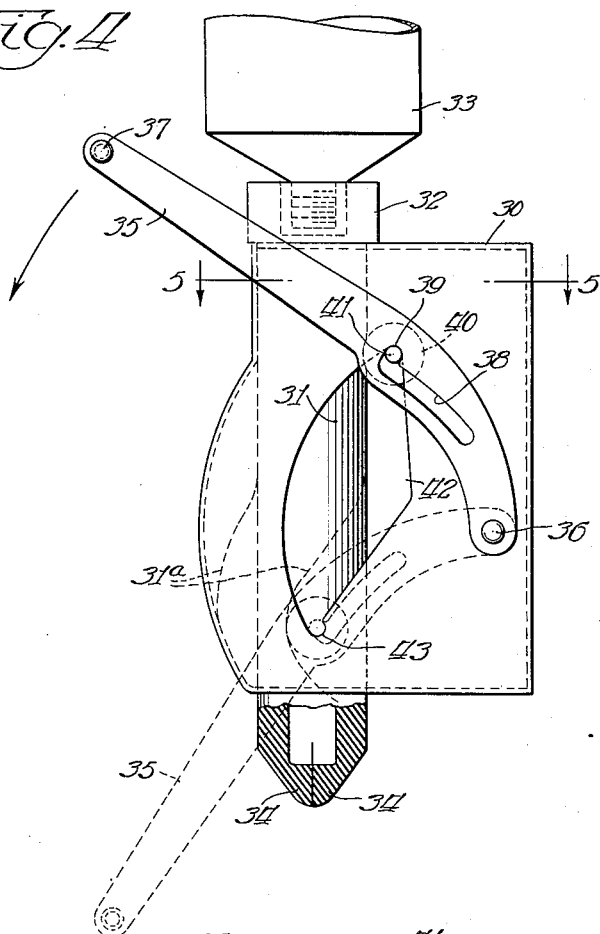
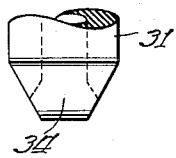
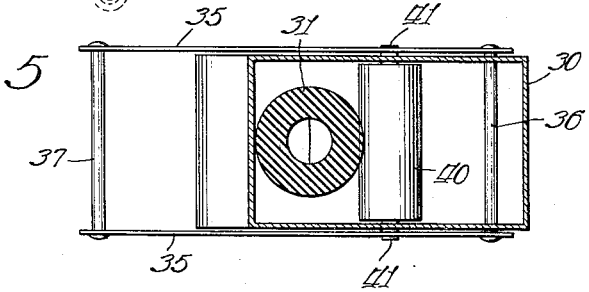

Patented Apr. 5, 1938

2,113,022

UNITED STATES PATENT OFFICE 2,113,022

DISPENSING DEVICE

Hans Hefti, Neenah, Wis.

Application February 26, 1937, Serial No. 127,817

12 Claims. (Cl. 221—60)

This invention relates to a dispensing device and more particularly to a device for dispensing material from collapsible containers such as are commonly used for tooth paste, shaving cream and other toilet and medical preparations.

The main object of the invention is to provide a simple but efficient mechanism which will be operative to dispense a predetermined amount of material when the device is actuated. Other objects of the invention are to provide dispensing means which will be easy to operate, easy to connect with the container of the material to be dispensed, and which will always be ready for operation; and in general, it is the object of the invention to provide an improved dispensing device of the type referred to.

Other objects and advantages of the invention will be understood by reference to the following specification and accompanying drawings (2 sheets), wherein there are illustrated dispensing devices embodying selected forms of the invention.

In the drawings—

One form of the improved device is illustrated in Figs. 1, 2, and 3, of which

Fig. 1 is a side elevation.

Fig. 2 is a view similar to Fig. 1, but showing the parts in a changed position, certain portions of the frame or casing of the device being broken away to more clearly illustrate certain parts; and

Fig. 3 is a plan.

A simpler form of device is shown in Figs. 4, 5 and 6, of which—

Fig. 4 is a side elevation;

Fig. 5 is a section on the line 5—5 of Fig. 4, and

Fig. 6 is a detail illustration of a discharge tube closure.

Referring now to the drawings, the improved dispensing device includes a casing 5 preferably formed of sheet metal bent to rectangular form in plan. The casing may either be formed of a flat strip of sheet metal bent to said shape and having its meeting edges suitably jointed or it may be formed of a section of tubing of appropriate cross section.

Adjacent the front wall of the frame or casing 5 there is positioned a length of rubber tubing 6 having its upper end provided with a nipple 7. The nipple 7 includes a portion 8 which fits tightly in and is preferably cemented in place in the upper or receiving end of the rubber tube element 6, and the opposite end of the nipple is provided with a screw-threaded receptacle 9 designed to receive the screw-threaded discharge end or mouth portion of a container 10 which is here shown as being a conventional collapsible tube.

The lower or discharge end of the rubber tube member 6 is preferably beveled as indicated and is provided with an end closure or seal element 11 which may consist of a flat piece or disc of resilient rubber provided with a slit indicated at 12. The closure element 11 is cemented or otherwise secured to the beveled end of the tube 6 and the slit 12 is normally closed so that the discharge end of the tube is also normally closed.

A pair of arms 13, 13 respectively located adjacent the opposite sides of the casing 5 carry a pin 14 at their outer ends and a roller 15 is journaled on said pin 14 between said arms. The pin 14 projects at its opposite ends beyond the arms 13, 13 and through openings 16 in the opposite sides of the frame, and it will presently appear that the edges of said openings 16 constitute guides along which the projecting ends of the pin 14 ride.

Intermediate their ends, the arms 13, 13 are also connected by a pin 17 which extends through the respective arms and projects through vertically elongated slots such as indicated at 18 in the opposite sides of the frame 5. At their upper ends, the slots 18 are preferably provided with a rearwardly offset portion 19 for a purpose which will presently appear.

A coil spring 20 connected between the pin 17 and an ear 21 struck out of the back wall of the frame 5 serves to normally hold the pin 17 in the upper and offset portion of the slot with the arms 13, 13 and roller or presser member 15 in the position illustrated in Fig. 1. The arms 13, 13 extend rearwardly and downwardly beyond the pivot pin 17 so as to provide bottom and rear edges 22 and 23 respectively, which are respectively adapted to engage the bottom and back of the casing.

For operating the dispensing device, a handle 24 is provided, said handle being in the form of a bail having its free ends 25, 25 turned inwardly and pivotally mounted in suitable apertures provided in the opposite sides of the frame 5. The handle element 24 overlies and engages the projecting ends of the pin 14, and cams such as indicated at 26 are provided on the handle for acting against said projecting pin ends.

When it is desired to dispense a quantity of material with which the device is used, the handle 24 is pressed downwardly. In its downward movement, the handle acting against the projecting ends of the pin 14 swings the arms 13 and pressing member or roller 15 downwardly and outwardly. Such outward swinging movement is facilitated by the provision of the offset end portions 19 of the slots 18 which tend to resist downward movement of the pin 17 until the presser roller 15 has been swung outwardly as far as possible. When the roller reaches its maximum outward position, further pressure on the handle 24 will of course cause the pin 17 to ride downwardly in the slots 18 while at the same time maintaining the presser roller 15 in its extreme outward position. In said extreme outward position, the presser roller 15 squeezes or collapses the resilient rubber tube 6 and as the movement of the roller 15 progresses downwardly, the material within the squeezed portion of the rubber tube will of course be forced downwardly and out through the slit 12 in the closure or valve piece 11. As shown in Fig. 2, the frame or casing 5 includes a front wall which supports the tube 6 to facilitate the squeezing action of the presser roll 15. The valve piece 11 being of rubber will permit the slit 12 to open sufficiently to permit the material to be discharged in a ribbon of suitable thickness. The cams 26 serve to hold the presser roller in advanced, operative position against any tendency thereof to move rearwardly due to the normal resistance offered to operative movement of the presser roller.

When the handle reaches its lowermost position shown in Fig. 2, the opposite ends of the pin 14 are seated in the lowermost portions of the openings 16 so that further pressure on the handle cannot cause further dispensing of material. Also, the mechanism of the device cannot be injured by excessive pressure on the handle 24. In their downward movement, the arms 13 assume a position which is substantially parallel to the position indicated in Fig. 2 wherein the rear ends 23 of the arms engage the back wall of the frame 5. Such engagement helps to limit the rocking movement of the arms 13, 13 so that some of the strain of such limitation is relieved from the projecting ends of the pin 14 and the portions of the frame engaged by such end portions.

When the handle 24 is released, the spring 26 is effective to restore the operating parts to the position illustrated in Fig. 1. At the beginning of the return movement, the spring 26 causes a rearward turning of the arms and hence retraction of the roller 15 from the tube 6, and upon complete retraction, i. e. substantial freeing of the roller from the tube, the arms and roller are caused to move upwardly as guided by the slots 18 and end portions of the pin 17.

During the downward movement of the roller 15, the tube is progressively squeezed from adjacent its receiving end toward its discharge end, thereby forcing material out of the discharge end of the tube. Since the tube 6 is of resilient rubber construction, it will be evident that as the roller 15 progresses, portions of the tube in back of the roller will automatically return to normal distended position and thereby draw down a fresh supply of material from the container 10. When the roller 15 is moved rearwardly from its extreme lowered position as shown in Fig. 3, similar expanding action of the tube follows in the last compressed portion thereof so that the interior of the tube is charged with material from the container 10 for substantially its entire length. Hence, in the operation of the device there will be no air spurts, but only solid streams of the material supplied in the container 10.

The above described device is of simple but sturdy construction and is accordingly easy to operate and durable and it is efficient while also being neat and attractive in appearance.

A simplified construction such as shown in Figs. 4 to 6 inclusive may be preferable for commercial purposes. The simplified construction comprises a sheet metal box-like casing 30 and a collapsible, resilient rubber tube 31, positioned in the front part of said casing. The said resilient tube 31 is provided at its upper end with a coupling element 32 which is adapted to receive the discharge end of a collapsible tube 33 or the discharge end of any other desired container.

The lower end of the resilient tube 31 is more or less pointed as indicated in Figs. 4 and 6, and it is provided with a closure comprising end portions 34, 34 which have flat faces normally engaging each other. In other words, the resilient tube 31 is provided with a closed end which is more or less pointed and slit so as to permit the forcing of material from within the tube through the slit end which may be opened up under the pressure of material forced therethrough.

A pair of arms 35, 35 are pivotally connected by means of a pin 36 to the opposite sides of the housing 30 and the outer or free ends of the arms are connected by means of a pin 37. Thus the arms 35, 35 together with the pin 37 constitute a bail-like handle and it will be apparent that, if preferred, the bail-like handle may be made of one piece of material bent to the desired bail form.

The arms 35, 35 are provided intermediate their ends, but nearer their pivotally mounted ends, with slots such as indicated at 38 which, at their outer ends, are provided with offset or detent portions 39. A presser member or roller 40 is disposed within the casing 30 and has shaft ends 41, 41 projecting outwardly through openings such as 42 in the sides of the housing and into the slots of the respective arms 35.

The operation of the device is indicated in Fig. 4. When the arms 35 are in their initial or raised position as shown in full lines, the presser member 40 is disposed adjacent the upper or receiving end of the tube 31 and only in light contact with the tube. It will be noted that there is no spring or other device for pressing the roller against the tube, the initial position being maintained only by the weight of the arms and roller forwardly of the pivot center 36.

To discharge material from the container 33, the arms 35 are moved downwardly thereby carrying the pressure roller 40 downwardly in an arc about the pivot center 36. In traveling about such an arc, the pressure roller squeezes the tube progressively from its upper end towards its lower or discharge end with the result that the material within the tube is forced out of the split lower end. The front wall of the casing 30 is arched vertically approximately concentric with the arc of travel of the pressure roller 40, and at such a distance therefrom that the flexible tube is supported sufficiently to facilitate the tube squeezing effect of the pressure roller. Such support, although desirable, is not essential, since the normal resistance of the tube to distortion by the roller may be made such as to enable the pressure roller to satisfactorily perform its function without the assistance of such support.

When the pressure roller reaches its lowermost position as illustrated in dotted lines in Fig. 4, the resilient tube 31 is distorted to approximately the shape indicated by the dotted lines 31ᵃ. It will be observed that because of the resiliency of the rubber tube, it will urge the roller to move towards the pivot center 36 so as to permit the tube to return to undistorted position. Such movement of the roller is permitted as soon as the arms 35 are permitted to move upwardly sufficiently to free the projecting pressure roller shaft ends 41 from detents 43 formed at the lower end of the openings 42. It will also be apparent that upon upward movement of the arms 35 from their lowermost position, the roller will tend to lag behind because of the resistance of the tube to distortion so that the roller shaft ends 41 will also be freed from the detents 39 in the outer ends of the slots 38. As soon as the pressure roller shafts are freed from the said detents, the normal resiliency of the tube 31 is operative to force the roller to move towards the pivot center 36, the roller being, of course, guided by the slots 38. It is also found that the arms 35 will almost always rise or return automatically to their initial position as an incident to the force applied to the roller which causes it to move toward the pivot center 36. During the upward or return movement of the arms 35, the shaft ends 41 will be guided by the rear edges of the openings 42 until the said shaft ends are restored to initial position in the detents 39.

When first placing the dispensing device in operation, a plurality of strokes of the pressure member may be required to draw material from the supply tube or container into the collapsible or resilient tube, but if preferred, the tube may first be filled with the material by initially squeezing the collapsible tube container or otherwise causing the discharge from the supply container 33 of the desired amount of material.

The described structure may be made in various forms other than those described, without departing from the spirit of the invention, the scope of which should be determined by reference to the following claims, the same being construed as broadly as possible consistent with the state of the art.

I claim:

1. In a dispensing device of the class described, the combination of a resilient tube, means for connecting one end of said tube to the discharge opening of a container, and means for progressively squeezing said tube from adjacent its receiving end to adjacent its other, discharge end to thereby force material from said discharge end of the tube.

2. In a dispensing device of the class described, the combination of a resilient tube, means for connecting one end of said tube to the discharge opening of a container, means for progressively squeezing said tube from adjacent its receiving end to adjacent its other, discharge end to thereby force material from said discharge end of the tube, and means for effecting restoration of said squeezing means to its initial position without squeezing said tube during the return movement of said means.

3. In a dispensing device of the class described, the combination of a resilient tube, means for connecting one end of said tube to the discharge opening of a container, means for progressively squeezing said tube from adjacent its receiving end to adjacent its other, discharge end to thereby force material from said discharge end of the tube, means for effecting restoration of said squeezing means to its initial position without squeezing said tube during the return movement of said means, and means for automatically closing the discharge end of said tube upon completion of the squeezing movement of said squeezing means.

4. A dispensing device of the class described, comprising a frame, a resilient tube positioned in said frame, means for connecting the discharge end of a container to one end of said tube, said tube end constituting its receiving end and the other end constituting its discharge end, a movable arm having a presser at one end, said arm being mounted in said frame for movement operative to guide said presser along said tube from adjacent its receiving end toward its discharge end and so as to squeeze the tube to force material out of its discharge end, said arm being also operative to guide said presser in return movement substantially free of said tube, and means for effecting movement of said arm substantially as described.

5. A dispensing device of the class described, comprising a frame, a resilient tube positioned in said frame, means for connecting the discharge end of a container to one end of said tube, said tube end constituting its receiving end and the other end constituting its discharge end, a movable arm having a presser at its outer end, means for mounting said arm for guiding movement of said presser, said mounting means including a pin projecting from said arm and a slot in said frame for receiving and guiding said pin, means acting on said arm to effect outward rocking movement thereof about said pin and downward movement of the arm and pin, the latter being guided in its movement by said slot, said presser being operative during its downward movement to squeeze said tube to effect discharge of material therefrom, and means operative upon completion of said downward movement, for effecting return movement of said arm and incidental inward rocking movement thereof about said pin to free the presser from said tube.

6. In a dispensing device of the class described the combination of a main frame, a resilient rubber tube mounted in said frame, means for connecting the discharge end of a container to one end of said tube, said tube end constituting its receiving end and its other end constituting its discharge end, an arm having a tube-pressing element adjacent one end and a pivot element projecting from another portion thereof, said frame having a slot for receiving said pivot element whereby said arm is mounted in said frame for rocking movement above said pivot element and sliding movement controlled by said slot, spring means normally holding said arm in predetermined position adjacent one end of said slot with its pressing element substantially free of said tube, and manually operable means for effecting downward and outward rocking movement of the presser end of said arm, thereby to progressively squeeze said tube from adjacent its receiving end toward its discharge end, said spring means being operative to yieldingly resist said downward movement of the arm and to effect return movement thereof with the presser element in retracted position relative to the tube.

7. In a dispensing device of the class described, the combination of a resilient tube, means for connecting one end of said tube to the discharge opening of a container, means for progressively squeezing said tube from adjacent its receiving end to adjacent its discharge end to thereby force material from the discharge end of the tube, and means for permitting restoration of said squeezing means to its initial position without operatively squeezing said tube during the return movement of said squeezing means.

8. In a dispensing device of the class described, the combination of a resilient tube, means for connecting one end of said tube to the discharge opening of a container, means for progressively squeezing said tube from adjacent its receiving end to adjacent its discharge end to thereby force material from the discharge end of the tube, the resiliency of said tube being such that said tube, when squeezed, urges said squeezing means to return to initial position, and means for permitting restoration of said squeezing means to initial position without squeezing said tube during the return movement of said squeezing means.

9. A dispensing device of the class described, comprising a frame, a resilient tube positioned in said frame, means for connecting the discharge end of a container to one end of said tube, said container receiving end of the tube constituting its receiving end and the other end of the tube constituting its discharge end, a movable arm, and a presser carried by said arm, said arm being mounted in said frame for movement operative to guide said presser along said tube from adjacent its receiving end toward its discharge end and so as to squeeze the tube to force material out of its discharge end, said arm being also operative to guide said presser back to initial position without operatively squeezing said tube.

10. A dispensing device of the class described, comprising a frame, a resilient tube positioned in said frame, means for connecting the discharge end of a container to one end of said tube, said container receiving end of the tube constituting its receiving end and the other end constituting its discharge end, a movable arm, a presser carried by said arm, and means for mounting said presser in said arm comprising a pin projecting from said presser and a slot in said arm for receiving and guiding said pin, said slot having a detent in its outer end for receiving said pin to lock the presser in predetermined position relative to the arm during the downward movement of the arm.

11. A dispensing device of the class described, comprising a frame, a resilient tube positioned in said frame, means for connecting the discharge end of a container to one end of said tube, said container receiving end of the tube constituting its receiving end and the other end of the tube constituting its discharge end, a bail-like member having substantially parallel arms embracing said frame and pivotally connected thereto, a presser carried by said member, and means for mounting said presser in said arms comprising pins projecting from the opposite ends of said presser and slots in said arms for receiving and guiding said pins, said slots each having a detent in its outer end for receiving said pins to lock the presser in predetermined position relative to the arm during the downward swinging movement of said bail-like member.

12. A dispensing device of the class described, comprising a frame, a resilient tube positioned in said frame, means for connecting the discharge end of a container to one end of said tube, said container receiving end of the tube constituting its receiving end and the other end of the tube constituting its discharge end, means for squeezing said tube to discharge material therefrom comprising a movable arm, and a presser carried by said arm, said arm being mounted in said frame for movement operative to guide said presser along said tube from adjacent its receiving end toward its discharge end and so as to squeeze the tube to force material out of its discharge end, a portion of said frame being disposed in such relation to the tube as to support the same against the pressure of said presser.

HANS HEFTI.